United States Patent
Xu (10) Patent No.: US 10,319,082 B2
(45) Date of Patent: Jun. 11, 2019

(54) SYSTEM AND METHOD FOR DETECTION AND REMOVAL OF THIN LINES IN A GRAPHIC IMAGE

(71) Applicant: ESKO SOFTWARE BVBA, Ghent (BE)

(72) Inventor: Neil Xu, Shanghai (CN)

(73) Assignee: ESKO SOFTWARE BVBA, Ghent (BE)

( * ) Notice: Subject to any disclaimer, the term of this patent is extended or adjusted under 35 U.S.C. 154(b) by 31 days.

(21) Appl. No.: 15/608,316

(22) Filed: May 30, 2017

(65) Prior Publication Data

US 2017/0345135 A1 Nov. 30, 2017

(30) Foreign Application Priority Data

May 30, 2016 (CN) .......................... 2016 1 0364711

(51) Int. Cl.
- *G06K 9/40* (2006.01)
- *G06T 5/00* (2006.01)
- *G06T 5/20* (2006.01)
- *G06T 11/00* (2006.01)

(52) U.S. Cl.
CPC ................ *G06T 5/005* (2013.01); *G06T 5/20* (2013.01); *G06T 11/003* (2013.01)

(58) Field of Classification Search
CPC .......... G06T 5/005; G06T 11/003; G06T 5/20
USPC ................ 382/260, 100, 255, 256, 257, 258
See application file for complete search history.

(56) References Cited

U.S. PATENT DOCUMENTS

| | | | | |
|---|---|---|---|---|
| 6,266,152 B1 * | 7/2001 | Nakajima | ............ | H04N 1/4072 358/1.9 |
| 9,117,118 B1 * | 8/2015 | Lewis | .................. | H04N 1/0044 |
| 9,235,755 B2 * | 1/2016 | Wu | ..................... | G06K 9/00449 |

OTHER PUBLICATIONS

Morphological Image Processing, https://www.cs.auckland.ac.nz/courses/compsi773s1 c/lectures/ImageProcessing-html/topic4.htm, 7 pages.*
Connected-component labeling, Wikipedia, 8 pages.

* cited by examiner

*Primary Examiner* — Sheela C Chawan
(74) *Attorney, Agent, or Firm* — RatnerPrestia (57) ABSTRACT

Presented is a method for identifying and removing one or more thin lines from a binary source image. The steps include generating a hole-filled intermediate binary image, and performing a thin line detection and removal process on the hole-filled intermediate binary image. The thin line detection and removal is performed by creating an eroded intermediate image, creating an opened intermediate image by performing a morphology dilation process, inverting the opened intermediate image, generating a density adjusted binary source image, generating a difference pixel intermediate image, generating a thin line subtraction intermediate image, and subtracting the thin line subtraction intermediate image from the binary source image to create a binary output image.

11 Claims, 10 Drawing Sheets

SYSTEM AND METHOD FOR DETECTION AND REMOVAL OF THIN LINES IN A GRAPHIC IMAGE

CROSS REFERENCE TO RELATED APPLICATION

This application claims priority to Chinese Patent Application No. 201610364711.6, filed May 30, 2016, the contents of such application being incorporated by reference herein.

BACKGROUND OF THE INVENTION

During flexography platemaking, scattered dots and thin lines may create dirty spots on the final image. Additionally, thin lines tend to be highlight tones (≤10%). Because removing such areas does not have a major impact on the final printing output, pre-press operators may typically choose to remove such thin lines to ensure a high quality output.

SUMMARY OF THE INVENTION

One aspect of the invention comprises a method for identifying and removing one or more thin lines from a binary source image. The method comprises generating a hole-filled intermediate binary image, including identifying holes by applying a Connected Component Labeling, Two-pass Algorithm to the binary source image and filling the holes so identified, and then performing a thin line detection and removal process on the hole-filled intermediate binary image. The thin line detection and removal process comprises the steps of creating an eroded intermediate image by performing a morphology erosion process on the hole-filled intermediate binary image using a first kernel size, then creating an opened intermediate image by performing a morphology dilation process on the on the eroded intermediate image using a second kernel size larger than the first kernel size, then inverting the opened intermediate image. Next, a density adjusted binary source image is generated by filtering the binary source image using a user-specified maximum density threshold, so that the density adjusted binary source image file includes only pixels corresponding to tones below the maximum density threshold. A difference pixel intermediate image is then generated by performing a binary AND operation between the inverted opened intermediate image and the density adjusted binary source image. A thin line subtraction intermediate image is generated by identifying and removing scattered dots from the difference pixel image by applying a Connected Component Labeling, Two-pass Algorithm to the difference pixel intermediate image, and the thin line subtraction intermediate image is subtracted from the binary source image to create a binary output image. The binary source image may comprise one channel of a multi-channel image, each channel comprising a grayscale image, in which case the method may further comprise separating the multi-channel image into a plurality of independent grayscale channels, converting each grayscale channel to a corresponding binary source image, and performing the foregoing steps on each corresponding binary source image.

Another aspect of the invention comprises a system for removing one or more thin lines from a binary input image. The system comprises one or more one computer memories for storing the binary input image, the intermediate images, the output image, and instructions readable by a machine for executing the method steps detailed above, and a processor configured to read and execute the instructions. The system may further comprise an output device for rendering the output image, such as an image setter or other device configured to render the output image on a flexographic printing plate. In a system in which the binary source image comprises one channel of a multi-channel image, each channel comprising a grayscale image, the system may further comprise a memory for storing instructions for separating the multi-channel image into a plurality of independent grayscale channels and converting each grayscale channel to a corresponding binary source image. Such a system may further comprise a printing system configured to supply ink to each printing plate corresponding to each channel, and to apply the ink from each printing plate to a medium for receiving the ink to form a printed image comprising a composite of the ink applied by each of the printing plates corresponding to each of the channels of the multi-channel image.

Yet another aspect of the invention comprises any method for identifying and removing one or more thin lines from a binary source image, the method comprising the steps of generating a difference file comprising thin lines to be removed from the binary source image file, and subtracting the difference file from the binary source image file to create a binary output image, wherein the step of generating the difference file comprises at least the step of conducting an opening operation, using a larger kernel size for an erosion step than a dilation step of the opening process. The step of creating the difference file may further comprise, prior to conducting the opening operation, filling holes in the binary source image file. The difference file may represent pixels and thin lines to be removed from the source image, or the method may comprise identifying and removing scattered dots from the difference file before subtracting the difference file from the binary source image to create the binary output image.

DETAILED DESCRIPTION OF THE INVENTION

Figure 1:
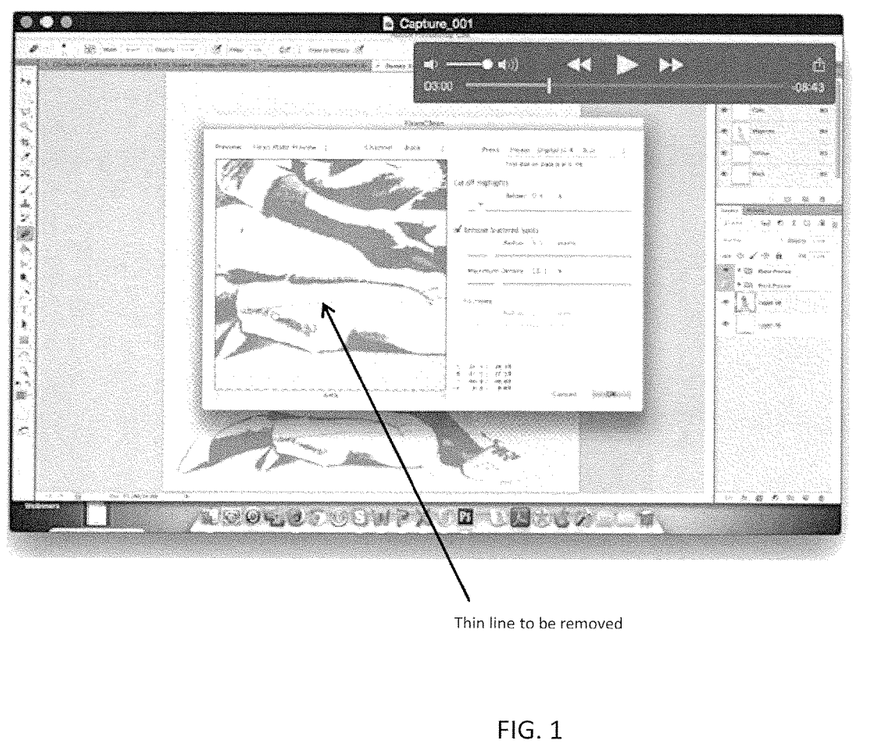
FIG. 1 is an illustration of an exemplary image having a thin line desired for removal, in accordance with embodiments of the invention.

The thin line removal method discussed herein is useful in the field of image processing, and particularly image processing for printing, and may be particularly useful in the field of flexographic printing to help a pre-press operator remove undesired components (e.g. thin lines) from the design of the flexo-plate, to improve printing quality of the plate. For example, it may be desired to remove the identified thin line from the image of FIG. 1.

One aspect of the invention comprises the use of a Morphology algorithm. Binary images may contain imperfections (e.g. distorted by noise and texture). Morphological image processing removes these imperfections.

One aspect of the invention comprises the use of a Morphology algorithm, such as is known in the art and is described, for example, in Morphological Image Processing by the Department of Computer Science at the University of Auckland, New Zealand, which is incorporated by reference herein.

Non-linear operations related to the shape and/or morphology of features in an image are utilized. Morphological image processing relies on relative ordering of pixel values, and not necessarily on their numerical values.

Figure 2:
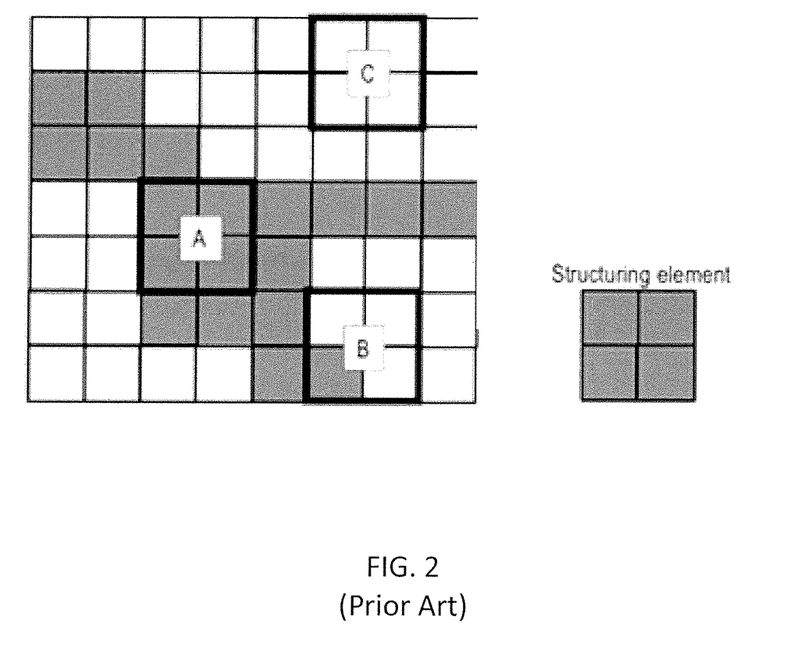
FIG. 2 is an illustration of probing of an image with a structuring element, in accordance with embodiments of the invention.

Generally, Morphological image processing utilizes a small shape called a structuring element to operate on the image. The structuring element moves across the image and it is compared with the neighborhood of pixels. Some operations test whether the element "fits" within the neighborhood, while others test whether it "hits" or intersects the neighborhood. See FIG. 2 which shows an illustration where the structuring element is shown to fit in the image in position A, hit a portion of the image in position B, and doesn't fit or hit the image in position C.

In general, the morphological image processing of a binary image creates a new binary image in which the pixel has a non-zero value if the test is successful. Structuring elements in morphological image processing are somewhat similar to convolution kernels in linear image filtering.

As a structuring element traverses over a binary image, each of its pixels is associated with the corresponding pixel of the neighborhood being overlapped by the structuring element. The structuring element fits the image if, for each of its pixels set to 1 the corresponding image pixel is also 1. In contrast, the structuring element hits (e.g. intersects) an image if at least for one of its pixels set to 1 the corresponding image pixel is also 1. Zero-valued pixels of the structuring element are ignored in this process.

Basic Morphological image processing techniques include erosion and dilation. The erosion of a binary image f by a structuring elements (denoted $f \ominus s$) produces a new binary image $g = f \ominus s$ with ones in all locations (x,y) of a structuring element's origin at which that structuring element s fits the input image f, e.g. $g(x,y)=1$ is s fits f and 0 otherwise, repeating for all pixel coordinates (x,y).

Erosion with smaller structuring elements shrinks an image by stripping away a layer of pixels from both the inner and outer boundaries of regions (e.g. small details are eliminated). Erosion with a large structuring element is similar to erosion using the smaller structuring element of the same shape. In one example, if $s_1$ and $s_2$ are a pair of structuring elements identical in shape, with $s_2$ twice the size of $s_1$, then $f \ominus s_2 \approx (f \ominus s_1) \ominus s_1$.

Erosion removes small details from a binary image and reduces the size of regions. Boundaries of each region can be found by subtracting the eroded image from the original image: $b = f - (f \ominus s)$ where f is an image of the regions, s is a structuring element, and b is an image of the region boundaries.

In contrast, dilation of an image f by a structuring element s (denoted $f \oplus s$) produces a new binary image $g = f \oplus s$ with ones in locations (x,y) of a structuring element's origin at which that structuring element s hits the input image f. For example, the following is repeated, $g(x,y)=1$ if s hits f and $g(x,y)=0$ otherwise. Dilation essentially has the opposite effect to erosion (e.g. it adds a layer of pixels to the inner and outer boundaries).

Dilation and Erosion are both affected by the size and the shape of a structuring element. As stated above, Dilation and Erosion have opposite effects.

Morphological image processing techniques may also be implemented as combinations of erosion, dilation, and simple set-theoretic operations. For example, the opening of an image f by a structuring element s (denoted by $f \circ s$) is an erosion followed by a dilation: $f \circ s = (f \ominus s) \oplus s$. Opening essentially opens up a gap between objects connected by a thin bridge of pixels. In another example, in contrast to opening, the closing of an image f by a structuring element s (denoted by $f \cdot s$) is a dilation followed by an erosion: $f \cdot s = (f \oplus s_{rot}) \ominus s_{rot}$. Closing essentially fills holes in the regions while keeping the initial region sizes.

Morphological filtering of an image (e.g. binary) utilizes structural elements that essentially act as filters. For example, opening with a structuring element may smooth corners from the inside, whereas closing with a structuring element may smooth corners from the outside. These operations can also filter out details that are smaller in size than the structuring element. Generally, only portions of the image that fit the structuring element are passed by the filter (e.g. smaller structures are blocked and excluded). The size of the structuring element is therefore important to eliminate unwanted details in the image, but not to damage objects of interest within the image.

Figure 3:
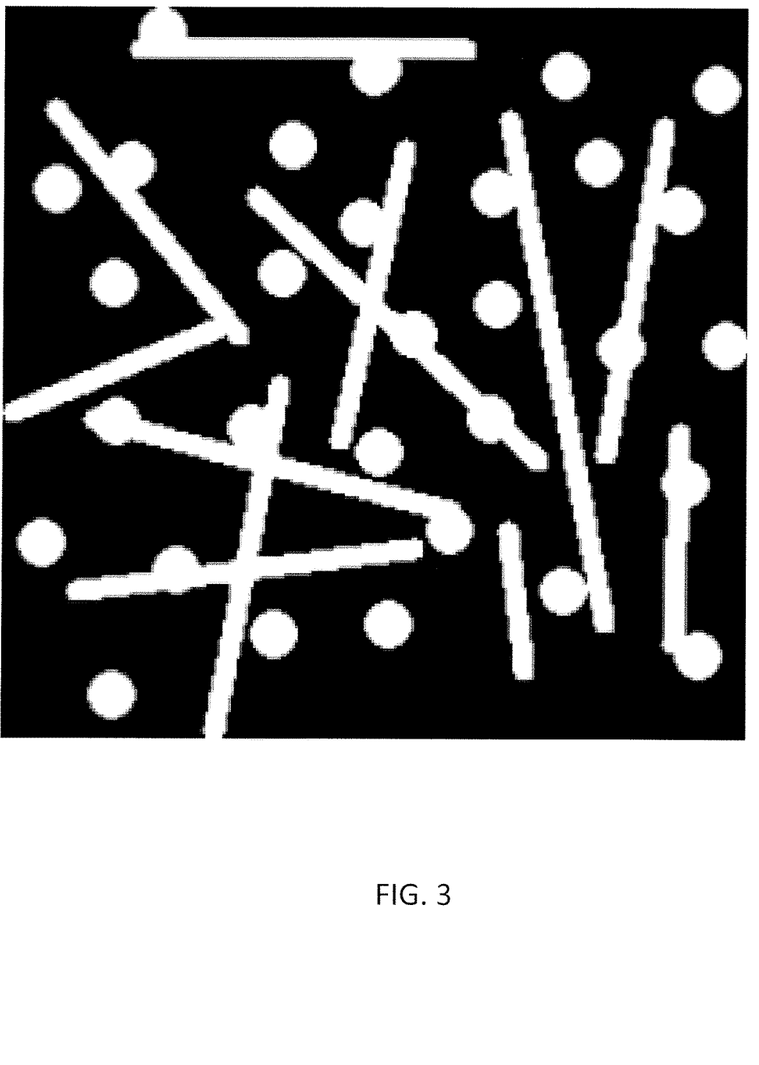
FIG. 3 depicts an exemplary image prior to performing an exemplary morphology opening step, in accordance with embodiments of the invention.
Figure 4:
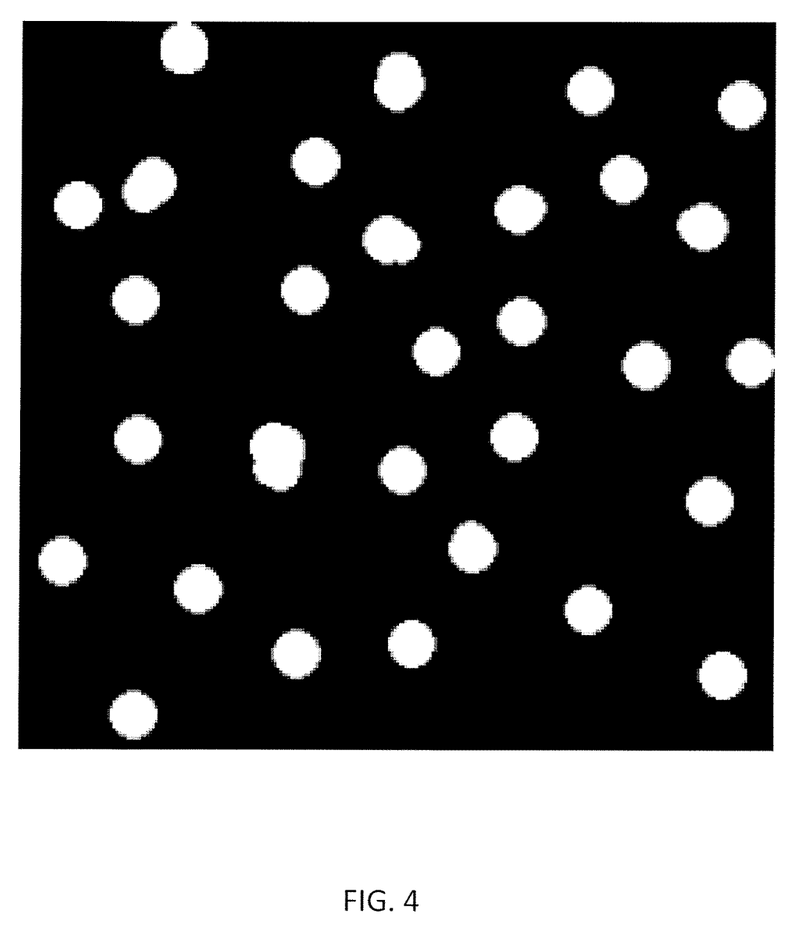
FIG. 4 depicts an exemplary output image resulting from performing the morphology opening step on the image FIG. 3, in accordance with embodiments of the invention.

An opening algorithm traditionally uses the same structuring element for both the erosion and dilation operations. Use of an opening algorithm alone, however, may cause some side effects. For example, as shown in FIGS. 3 and 4 a typical effect of a morphology opening step, is that the output image (FIG. 4) may break thin connected parts (thin lines) from the input image (FIG. 3).

Another algorithm used in performing exemplary embodiments of the invention includes a Connected Component Labeling, two-pass algorithm which may be used to discover certain spots and holes on the image, as described in Connected-component labeling from Wikipedia, which is incorporated herein by reference.

A graph is generated from input data. The graph includes vertices and connecting edges. An algorithm moves across the graph, labeling the vertices based on the connectivity and relative values of their neighbors. Pixel connectivity is a way in which pixels relate to neighboring pixels. Connectivity may be determined by image graphs which, for example, may be 4-connected or 8-connected.

Figure 5:
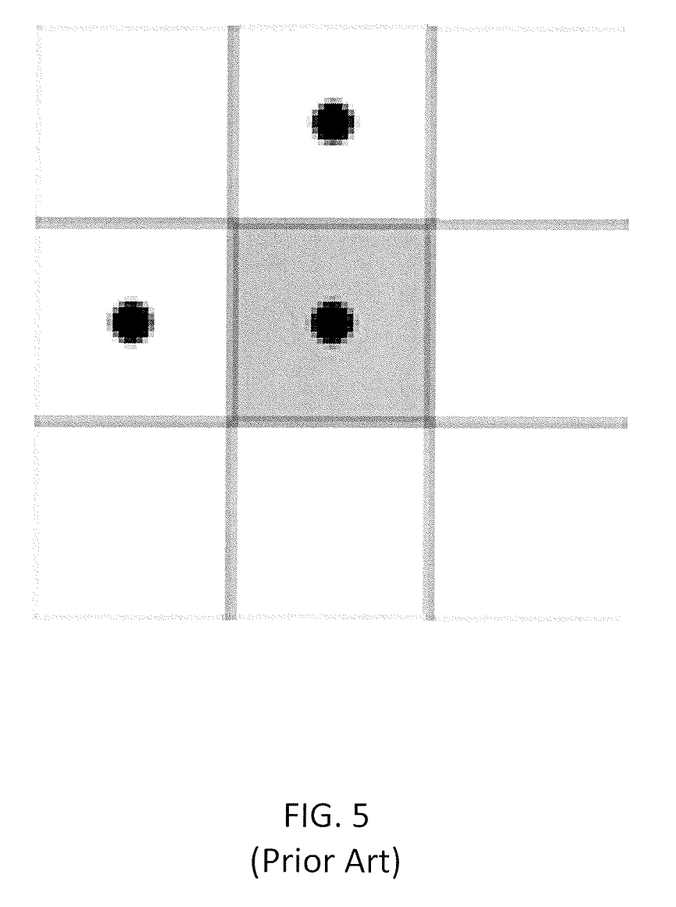
FIG. 5 is an illustration of 4-connectivity, in accordance with embodiments of the invention.

For example, 4-connected pixels are neighbors to a pixel that touches one of its 4 edges. This is shown in FIG. 5 where the center pixel is 4-connected to pixels with dots above and to the left on the corresponding edges.

Figure 6:
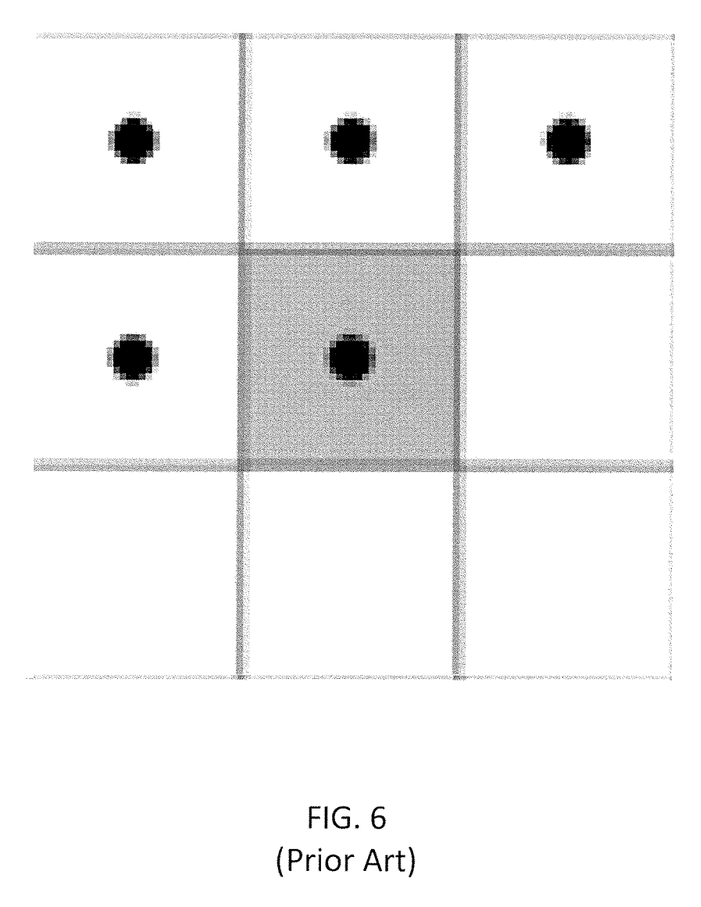
FIG. 6 is an illustration of 8-connectivity, in accordance with embodiments of the invention.

In contrast, 8-connected pixels are neighbors to a pixel that touch one of its 4 edges or 4 corners (i.e. 8 total connection points). This is shown in FIG. 6 where the center pixel is 8-connected to pixels with dots touching its left and upper edges and two upper corners.

One example algorithm is a one-component-at-a-time method. Basically, once the first pixel of a connected component is located, all connected pixels are labelled before moving to the next pixel in the image. In a first step, the algorithm selects the first pixel in the image and sets the current label equal to 1. In a second set, if the selected pixel is a foreground pixel and it is not already labeled, then it gets the current label and is added as the first element in a queue. In the second step, if it is a background pixel or it was already labelled, then step 2 is repeated for the next pixel in the image. In a third step, the algorithm takes an element from the queue, and looks at connectivity to its neighbors. If a neighbor is a foreground pixel and is not already labelled, it gets the current label and is added to the queue. The third step is repeated on all elements in the queue. In a fourth step, the algorithm increments the current label by 1 and repeats the second step.

Another algorithm is a two-pass method which iterates through the binary data. The algorithm takes two passes over the image. The first pass is to assign temporary labels and record equivalences and the second pass to replace each temporary label by the smallest label of its equivalence class.

Connectivity checks are carried out by checking neighbor pixels' labels. For example, if 4-connectivity is used, the top, bottom, left and right pixels relative to the pixel in question are used. Other non-connected pixels are ignored.

Figure 7:
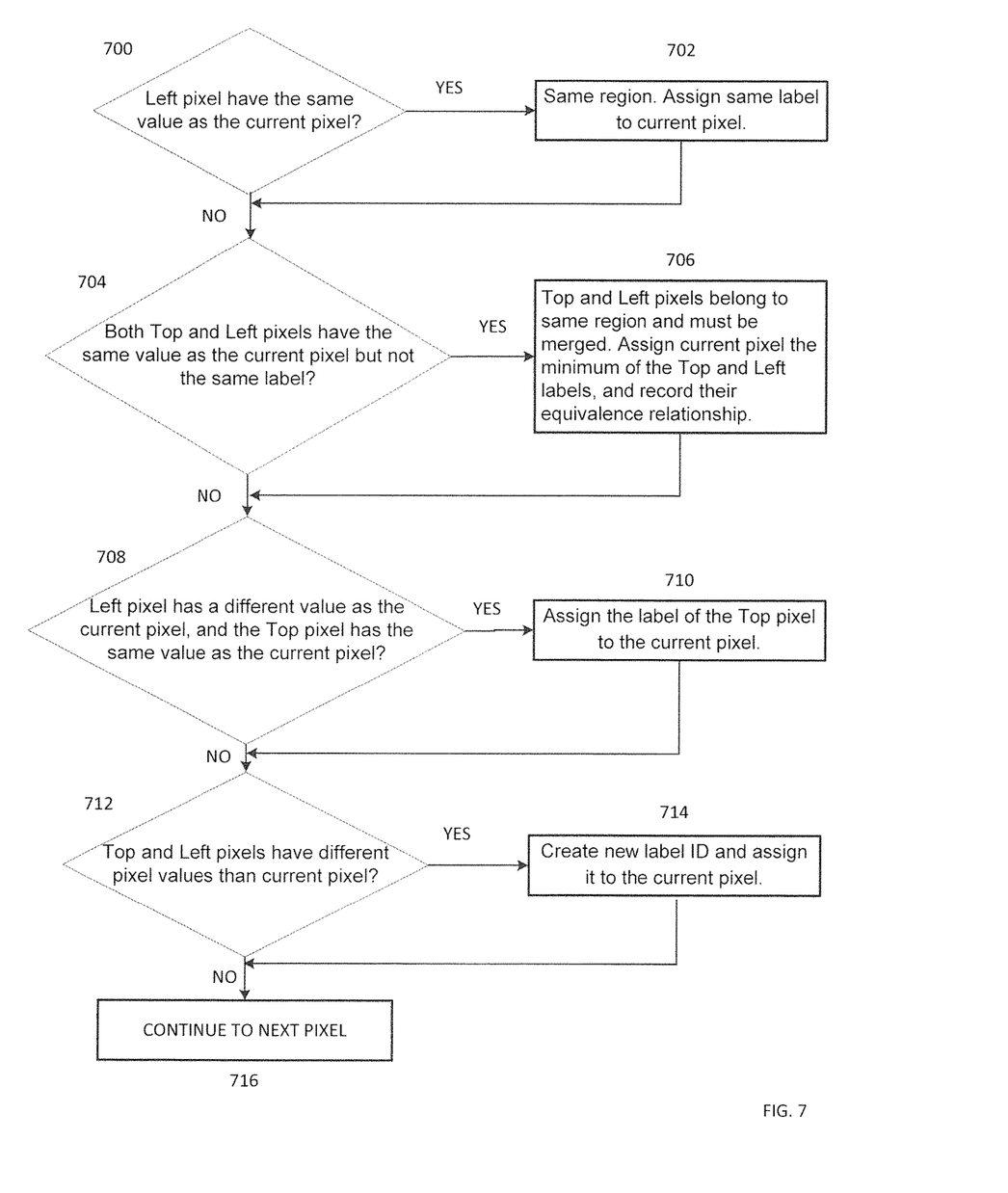
FIG. 7 is flowchart describing how connectivity checks are performed.

The two-pass algorithm is shown, for example, in FIG. 7. In step 700, the algorithm determines if the Left pixel has the same value as the current pixel. If the condition of step 700 is satisfied, then in step 702, the algorithm assigns the same label to the current pixel. Then in step 704, the algorithm determines if both the Top and Left pixels have the same value as the current pixel but not the same label. If the condition of step 704 is satisfied, then in step 706, the algorithm merges the Top and Left pixels belonging to same region, assigns the current pixel the minimum of the Top and Left labels, and records their equivalence relationship. Then in step 708, the algorithm determines if the Left pixel has a different value as the current pixel, and if the Top pixel has the same value as the current pixel. If the condition of step 708 is satisfied, then in step 710, the algorithm assigns the label of the Top pixel to the current pixel. Then in step 712, the algorithm determines if the Top and Left pixels have different pixel values than the current pixel. If the condition of step 712 is satisfied, then in step 714, the algorithm creates new label ID and assigns it to the current pixel. Then in step 716, the algorithm continues on to the next pixel to be evaluated and creates new region labels where needed.

An example of a fast scanning algorithm for connected-region extraction is presented below.

On the first pass:
1. The algorithm iterates through each element of the data by column, then by row (Raster Scanning).
2. If the element is not the background:
   The algorithm gets the neighboring elements of the current element.
   If there are no neighbors, the algorithm uniquely labels the current element and continues.
   Otherwise, the algorithm finds the neighbor with the smallest label and assigns it to the current element.
   The algorithm then stores the equivalence between neighboring labels.

On the second pass:
1. The algorithm iterates through each element of the data by column, then by row.
2. If the element is not the background, the algorithm re-labels the element with the lowest equivalent label.

Figure 8:
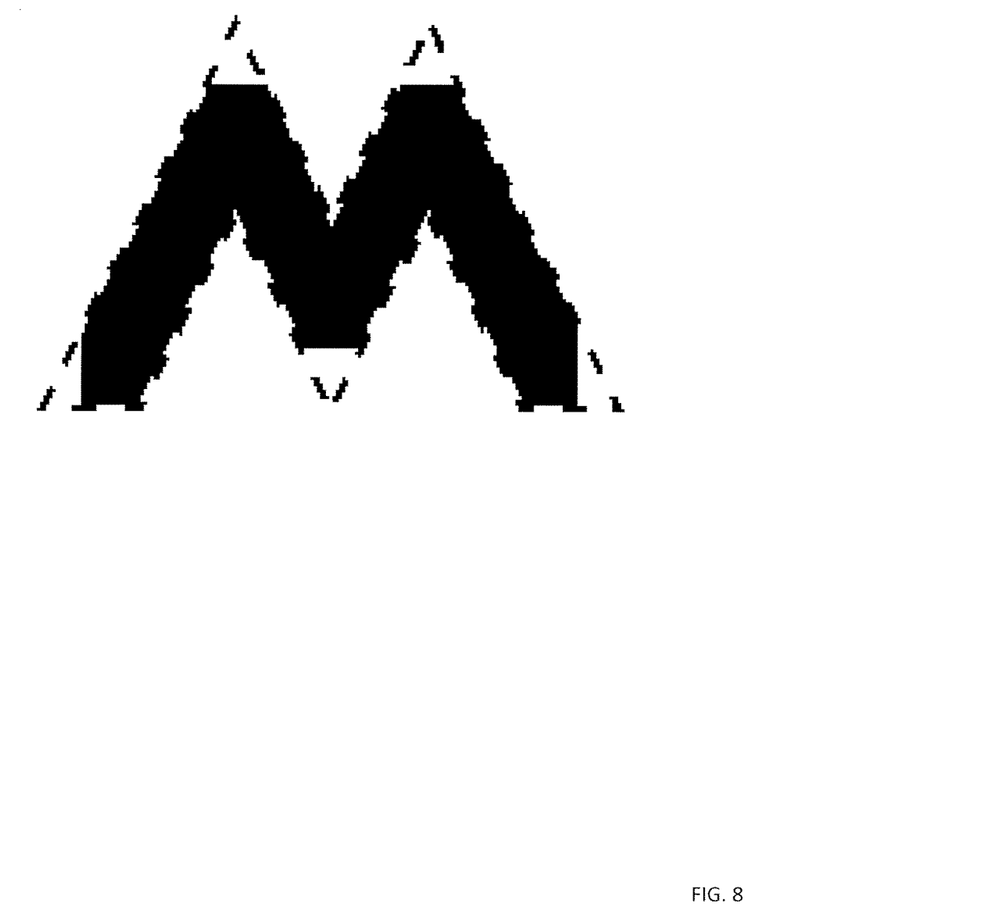
FIG. 8 depicts an exemplary result of applying an opening algorithm using a square kernel of an exemplary character "M", in accordance with embodiments of the invention.

One problem in applying a morphology opening algorithm, is that it may create artifacts at the corner and "coastlines" of the "island". For example, as shown in FIG. 8, applying an opening algorithm using a square kernel removes the sharp corner of the character "M". In flexography retouching, it is desired only to remove isolated thin lines, without modifying the corners and coastlines of larger shapes. The method described herein resolves this issue by first using a kernel during the dilation substep of the opening process that is larger (e.g. preferably, at least 2 pixels larger in each dimension) than the kernel used during the erosion substep of the opening process. For example, if a 2×2 (4 pixel) kernel is used for the erosion step, the kernel used for the dilation step is preferably a 4×4 pixel (16 pixel) kernel. Secondly, the dilation of the opening process is "context aware" of the source image, and in the dilation step only add pixels back to the result if there is a pixel on the source image, in which case the value of the source image pixel is used.

Another problem in applying a morphology opening algorithm to address thin lines is that it may cause unwanted removal of scattered spots. While in some cases, removal of scattered spots at the same time may be desirable, in other embodiments, it may be preferred to provide a thin line removal step that only cleans up thin lines, not scattered dots, so that a user can have control over both thin line removal and scattered dot removal as optional, separate functions.

An exemplary method for removing thin lines without removing scattered dots using the opening process, may include the following steps:

(a) Perform an opening algorithm on an input image to produce a first intermediate image.

(b) Subtract the resulting first intermediate image generated in step (a) from the input image to generate a difference pixel image.

(c) Use the Connected Component Labeling, Two-pass Algorithm as described herein to the difference pixel image of step (b), to find and remove the scattered dots from the difference pixel image, to produce a second intermediate image.

(d) Subtract the second intermediate image from the source image to get thin line removed output image without scattered dot removal.

Figure 9:
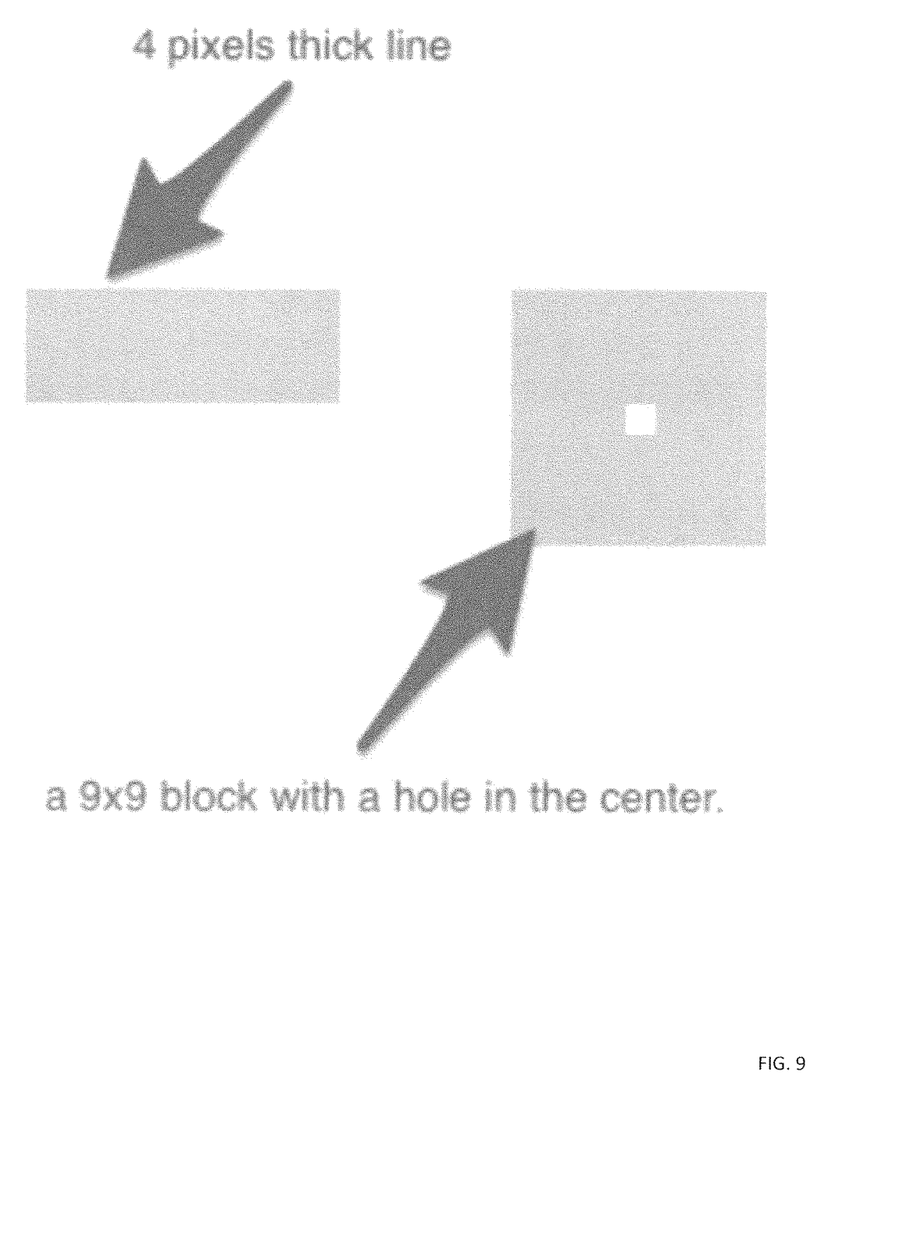
FIG. 9 depicts an exemplary line and an exemplary block with a hole in the center, in accordance with embodiments of the invention.

Another potential problem with the use of a morphology opening algorithm to remove thin lines, is that it may very aggressively remove "land" surrounding holes. For example, consider the image shown in FIG. 9, comprising a line that is 4 pixels thick and a 9×9 pixel block with a hole in the center. When applying an opening algorithm using a 5×5 kernel, both features will be removed by the opening algorithm, because a 5×5 kernel cannot be fit into either shape. But, in a thin line removal process, only the 4 pixel line would be desired for removal, not the block with the center hole. Accordingly, the following method steps may be implemented to avoid such an undesirable result.

(a) Identify holes (using the Connected Component Labeling, Two-pass Algorithm) on the source image;

(b) Generate a hole-filled intermediate image comprising the source image with all of the holes identified in step (a) filled;

(c) Apply the thin line removal process as described herein on the hole-filled intermediate image.

As is well known in the art, graphic images typically comprise a plurality of layers or "channels," with each channel corresponding to a particular ink color. For example, most printing technologies include at least Cyan, Magenta, Yellow, and Black channels, although additional spot colors may also be used, and the invention is not limited only to CMYK color. Each channel is treated is processed independently from the other channels in accordance with this invention. As is also known in the art, printed images generally involve binary files that result from the application of a screening step to a grayscale image, such that any shades of light or dark tone in the image are represented by less dense and more dense concentrations of on/off pixels, respectively. Thus, if a file is not already in binary form, it is preferably first converted to binary form before conducting the processing steps.

Thus, one exemplary embodiment for identifying and removing only thin lines comprises the following method steps:

(a) generating a binary source image, such as by converting each gray scale channel to a binary image, if necessary;

(b) generating a hole-filled intermediate binary image, by performing the steps of:
  (i) identifying holes using a Connected Component Labeling, Two-pass Algorithm on the binary image;
  (ii) filling the holes identified in step (b)(i);

(c) performing a thin line detection and removal process on the hole-filled intermediate binary image, by performing the steps of:
  (i) creating an eroded intermediate image by performing a morphology erosion process on the hole-filled intermediate binary image using a first kernel size;
  (ii) creating an opened intermediate image by performing a morphology dilation process on the on the eroded intermediate image using a second kernel size larger than the first kernel size;
  (iii) inverting the opened intermediate image resulting from step (c)(ii) so that the inverted intermediate opened image represents the area that needs to be removed from the source image;
  (iv) generating a density adjusted binary source image by filtering the binary source image using a user specified "max density" threshold, so that the density adjusted binary source image file includes only pixels that are below the "max density" threshold;
  (v) generating a difference pixel intermediate image by performing a binary AND operation, also known as an "intersection" operation, between the result of steps (c)(iii) and (c)(iv), the result of which represents pixels and thin lines to be removed from the source image;
  (vi) generating a thin line subtraction intermediate image by identifying and removing scattered dots from the difference pixel image by applying a Connected Component Labeling, Two-pass Algorithm to the difference pixel intermediate image;
  (vii) subtracting the thin line subtraction intermediate image from the binary source image.

The algorithms described above are used to ensure that an image to be printed does not have features (e.g. thin lines) that will not print properly due to the resolution of the printing device (e.g. the resolution of the flexo-plate). For example, flexo-plates may be designed and manufactured using numerous methods.

One such method uses a light-sensitive polymer. A film configured as a negative of the image is placed over the plate, which is exposed to light (e.g. ultra-violet light). The polymer hardens where light passes through the film. The remaining polymer has a softer consistency that can be washed away (e.g. using a solvent). Brushes may then be used to scrub the plate to facilitate the "washout" process. The result is the flexo-plate for printing.

A second method is based on a molding process. A metal plate is created out of the negative of the image (e.g. exposition process followed by an acid bath). The metal plate is then used to create the mold. Once cooled, this mold presses a compound (e.g. rubber or plastic) through a second molding process to create the printing plate.

Figure 10:
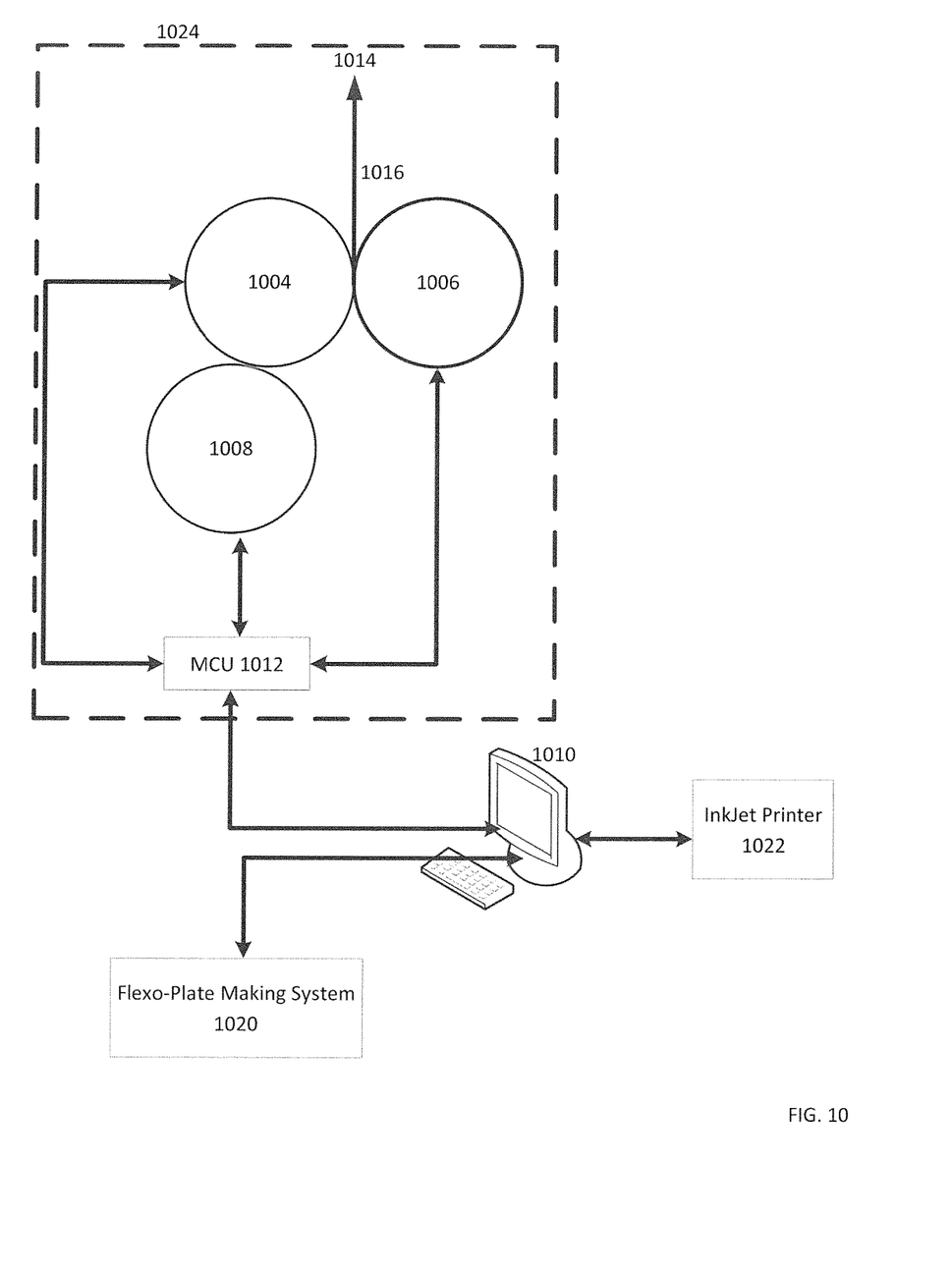
FIG. 10 depicts an exemplary flexographic plate-making and printing system, in accordance with embodiments of the invention.

Yet a third method uses a computer-guided laser to etch the image onto the printing plate. Using either method, a printing plate is created. This printing plate may then be installed into a flexographic printing system. FIG. 10 shows a system that includes a flexo-plate making system 1020, a flexographic printing system 1024, and an inkjet printer 1022.

Flexo-plate making system 1020 may be a system that implements any of the three plate making methods described above. In one example, PC 1010 either generates or receives an image for printing. PC 1010, which includes a processor (e.g. image processor), performs one or more of the morphological and/or connectivity algorithms described above to remove unwanted features (e.g. thin lines) from the image. Once the algorithm removes these unwanted features, PC 1010 then controls flexo-plate making system 1020 to create a flexo-plate of the processed image. The created flexo-plate may then be installed into a flexographic printing system 1024.

The flexographic printing system 1024 may include a printing plate drum 1004, an impression drum 1006 which receives the input substrate 1016 from an input drum (not shown), ink supply drum 1008, a microcontroller unit MCU 1012 and a computer 1010 for performing the algorithms and controlling the overall printing operation. During operation, the substrate moves in direction 1014 as the substrate unwinds from input roll (not shown). Ink supply drum 1008 then applies ink to printing plate drum 1004 which includes the flexographic plate. As the substrate 1416 moves through the system, impression drum 1006 presses the substrate against the printing plate drum 1004. With this force, the ink on the flexographic plate of the printing plate drum 1004 is transferred onto the substrate.

Although the algorithms discussed above were described for implementation in flexo-plate making, they may also be used for processing images prior to printing on other devices. For example, FIG. 10 shows an inkjet printer 1022. All printers, including inkjet printer 1022 have a limitation on their printing resolution. Thus, PC 1010, may process the image to be printed as described above to remove unwanted features (e.g. thin lines) that may not print properly due to limited resolution of printer 1022. Once the image is processed, the image may be sent to the inkjet printer 1022 for printing as usual. These image processing algorithms may be beneficial to all types of printing devices to ensure that the final printed product is desirable.

The methods disclosed herein may be performed by a system comprising one or more one computer memories for storing the binary input image, the intermediate images, the output image, and instructions readable by a machine for executing the method steps, wherein the system further comprises a computer processor configured to read and execute the stored instructions on the stored binary input image to create a stored output image. Such a system may further comprise an output device for rendering the output image, such as but not limited to any type of rastering device known in the art, such as a display, an image setter, a printer, or the like. In particular, the output device may be a device, such as an image setter, configured to render the output image on a printing plate (preferably a flexographic printing plate) or on a printing plate intermediate (such as a film or mask used for exposing a printing plate). Typically, the binary source image comprises one channel of a multi-channel image, each channel comprising a grayscale image, and the system further comprises a memory for storing instructions for separating the multi-channel image into a plurality of independent grayscale channels and converting each grayscale channel to a corresponding binary source image. The system described herein may be a component of a printing system that further comprises a printing press configured to supply ink to each printing plate corresponding to each channel of the multi-channel image, and to apply the ink from each printing plate to a medium (such as paper, plastic, or any material used in packaging) for receiving the ink. The systems and methods described herein are thus useful to create printed images comprising a composite of the ink applied by each of the printing plates corresponding to each of the channels of the multi-channel image.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for identifying and removing one or more thin lines from a binary source image, the method comprising the steps of:
    (a) generating a hole-filled intermediate binary image, by performing the sub-steps of identifying holes applying a Connected Component Labeling, Two-pass Algorithm to the binary source image;
    (ii) filling the holes identified in step (a)(i);
    (b) performing a thin line detection and removal process on the hole-filled intermediate binary image, by performing the steps of:
    creating an eroded intermediate image by performing a morphology erosion process on the hole-filled intermediate binary image using a first kernel size;
    (ii) creating an opened intermediate image by performing a morphology dilation process on the eroded intermediate image using a second kernel size larger than the first kernel size;
    (iii) inverting the opened intermediate image resulting from step (b)(ii);
    (iv) generating a density adjusted binary source image by filtering the binary source image using a user-specified maximum density threshold, so that the density adjusted binary source image file includes only pixels corresponding to tones below the maximum density threshold;
    (v) generating a difference pixel intermediate image by performing a binary AND operation between the result of steps (b)(iii) and (b)(iv), the result of which represents pixels and thin lines to be removed from the source image;
    (vi) generating a thin line subtraction intermediate image by identifying and removing scattered dots from the difference pixel intermediate image by applying a Connected Component Labeling, Two-pass Algorithm to the difference pixel intermediate image;
    (vii) subtracting the thin line subtraction intermediate image from the binary source image to create a binary output image.

2. The method of claim 1, wherein the binary source image comprises one channel of a multi-channel image, each channel comprising a grayscale image, further comprising separating the multi-channel image into a plurality of independent grayscale channels, converting each grayscale channel to a corresponding binary source image, and performing the steps of claim 1 on each corresponding binary source image.

3. A system for removing one or more thin lines from a binary input image, the system comprising:
    one or more one computer memories for storing the binary input image, the intermediate images, the output image, and instructions readable by a machine for executing the method steps of claim 1, and;
    a processor configured to read and execute the instructions.

4. The system of claim 3, further comprising an output device for rendering the output image.

5. The system of claim 4, wherein the output device comprises a device configured to render the output image on a flexographic printing plate.

6. The system of claim 4, wherein the binary source image comprises one channel of a multi-channel image, each channel comprising a grayscale image, and the system further comprises a memory for storing instructions for separating the multi-channel image into a plurality of independent grayscale channels and converting each grayscale channel to a corresponding binary source image, the system further comprising a printing system configured to supply ink to each printing plate corresponding to each channel, and to apply the ink from each printing plate to a medium for receiving the ink to form a printed image comprising a composite of the ink applied by each of the printing plates corresponding to each of the channels of the multi-channel image.

7. A method for identifying and removing one or more thin lines from a binary source image, the method comprising the steps of:
    (a) generating, by a processor, a difference file comprising thin lines to be removed from the binary source image file,
    wherein the step of generating the difference file comprises at least the steps of:
    creating, by the processor, an eroded image by eroding an image using a first kernel size,
    creating, by the processor, an opened image by dilating the eroded image using a second kernel size larger than the first kernel size; and
    (b) subtracting, by the processor, the difference file from the binary source image file to create a binary output, image.

8. The method of claim 7, wherein the step of creating the difference file further comprises, prior to conducting the opening operation, filling holes in the binary source image file.

9. The method of claim 8, wherein the difference file represents pixels and thin lines to be removed from the source image.

10. The method of claim 8, further comprising identifying and removing scattered dots from the difference file before subtracting the difference file from the binary source image to create the binary output image.

11. The method of claim 7, further comprising the steps of:

controlling, by the processor, a system to create a plate for printing the binary output image on a substrate.

* * * * *